July 22, 1969 — K. E. HUMBERT, JR — 3,456,800
FILTER STRUCTURE WITH ALTERNATIVE INLET AND
OUTLET HOUSING OPENINGS
Filed Dec. 6, 1966

INVENTOR
Kingsley E. Humbert, Jr.

BY Shoemaker and Mattare
ATTORNEYS

United States Patent Office 3,456,800
Patented July 22, 1969

3,456,800
FILTER STRUCTURE WITH ALTERNATIVE INLET AND OUTLET HOUSING OPENINGS
Kingsley E. Humbert, Jr., Gastonia, N.C., assignor to Wix Corporation, Gastonia, N.C., a corporation of North Carolina
Filed Dec. 6, 1966, Ser. No. 599,600
Int. Cl. B01d 35/14, 27/10
U.S. Cl. 210—130                       11 Claims

ABSTRACT OF THE DISCLOSURE

The filter structure is a self-contained unit having connections to the fluid flow lines whereby it may be so connected in the lines and with self-contained valves operated upon by high pressure of the fluid in order that the fluid will by-pass the filter media when the same is contaminated or blocked regardless of direction of flow.

Background of the invention

The filter structure relates to a replacement filter structure which may be used in place of filter structures that are made at time of replacement thereby becoming contaminated and that must be made on particular parts for the direction of fluid flow where used. The filter here disclosed is a factory made unit, fabricated under clean conditions and may be installed regardless of direction of fluid flow.

Summary of the invention

This invention relates to a filter structure made at a factory under clean conditions into a self-contained unit with the unit to be inserted into a housing provided on or in a structure. The unit having valves so mounted therein that it may be inserted into the housing regardless of direction of fluid flow with the valves operating in such a manner as to allow the fluid to by-pass the filter media when such media becomes clogged or so contaminated with filtrate that the fluid will not flow therethrough. Thus the structure upon which the filter structure is mounted will not be deprived of the fluid regardless of the condition thereof. The valves will also allow the by-passing of the filter when the fluid is cold or of high viscosity.

Description of the preferred embodiments

Figure 1:
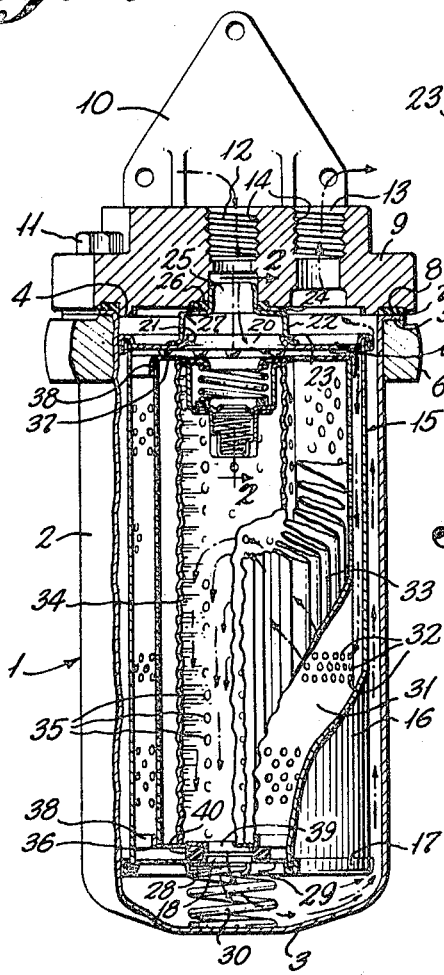
FIG. 1 is a view partly in cross-section of the housing with the filter structure therein and the flow path in one direction.

This invention relates to a filter unit for use in a filter housing generally designated 1. The filter housing consists of an elongated tubular body 2 having a closed end 3 and an open end 4. The open end has a flange 5 thereon which rests on an attachment ring 6. A sealing gasket 7 rests on the upper surface of the flange 5, and is received in a recess 8 formed in a head 9. The head 9 has a bracket 10 affixed thereto by means of which the filter housing is attached to the motor or to a support in the flow line. Bolts 11 connect the head 9 to the attaching ring 6 forcing the gasket 7 onto the flange 5 to seal off the connection. The head 9 has two bores therein, 12 and 13. The bores 12 and 13 interchangeably become the inlet and outlet of the filter housing. Each bore has screw threads 14 therein by which the flow lines may be attached to the filter housing. The lower parts of the bores 12 and 13 have smooth walls for receiving a connection with the filter element.

Insertable into the filter housing 1 is a filter unit generally designated 15 comprising an outer shell 16 of a solid wall cylindrical structure with an end plate 17 roll seamed to the body 16. The end plate 17 has an opening 18 centrally thereof, the purpose of which will be presently explained. Connected to the upper part of the cylindrical body 16 is an end plate 19 by a roll seam or the like. The end plate 19 has a central opening 20 therein which is surrounded by an upstanding flange 21. Surrounding the flange is a cylindrical connecting body 22 having at the end thereof a flange 23 which surrounds the outer surface of the flange 21, and is affixed thereto by means of welding or any other type of fastening. The body 22 extends upwardly from the end plate 19 to a point adjacent the lower part of the head 9 where the seam is turned inwardly at right angles to the body 22 as at 24 thus forming a reduction in the size of the body 22. Extending upwardly from the right angle portion is a nipple 25 which is received in the bore 12. The lower end of the bore 12 has a recess 26 therein into which a sealing ring 27 which rests on the upper surface of the right angle portion and seals the filter unit to the attaching head.

Mounted on the under side of the end plate 17 is a ring 28 by welding or otherwise. The ring 28 has ears 29 thereon which are bent around the upper end of a coil spring 30. Thus the spring 30 is mounted on the filter unit and engages the closed end 3 of the housing. When the filter unit is placed within the housing 1 and the nipple 25 is forced up into the bore 12, the spring 30 will present enough pressure to maintain the filter unit 15 and the nipple 25 is in position so that the seal 27 will prevent leakage between the nipple and the upper end of the filter housing. Also, the spring 30, together with the nipple 25 will maintain the filter unit 15 centered within the housing 1 in such a position that the fluid flowing through the housing and filter unit will flow around the end plates 17 and 19.

Mounted within the casing 16 is the filter media which comprises an outer wrap 31 perforated as at 32, a pleated paper filter media 33, tubular in form and a center tube 34 also having perforations 35, end caps 36 and 37 each having flanges 38 engaging the outer wrap 31 and holding the various parts of the filfiter media in assembled position. The end cap 36 which is adjacent the end plate 17 of the filter unit 15 has an opening 39 therein which coincides with the opening 18 in the end plate 17. Surrounding the two openings 18 and 39 is a sealing element 40 which prevents the fluid from passing into the area between the outer wrap 31 and the outer shell 16 except where desired.

The end plate 19 has protuberances 37' thereon to engage the end cap 37 and space the filter media within the unit. The end cap 37 has a central opening 41 therein surrounded by an inwardly turned flange 42. Mounted between the flange 42 and the center tube 34 is a valve housing 43 having a solid body portion 44 and an outwardly turned flange 44' resting upon the inner surface of the end cap 37 and affixed thereto by welding or other means. The solid body portion 44 of the valve housing 43 has an inwardly turned bottom wall 45 substantially at right angles to the body portion. The inwardly part of the lower portion 45 has a downwardly curved portion 46 and extending inwardly and upwardly from the curved portion is a flange 47 which has a central opening 48 therein. Between the right angle bend 49 and the curved portion 46 there is formed a plurality of openings 50 forming flow openings for the fluid in one direction of flow. Normally covering the flow opening 50 is a ring shaped valve 51 having an inner flange 51' at right angles to the valve 51. The upper surface of the valve 51 is engaged by a coil spring 52, outwardly of the flange 51' with the other end of the spring 52 engaging the end cap 37 outside of the inwardly extending flange 41. The spring 52 normally forces the valve 51 to a closed position.

Affixed to the bottom or outer side of the bottom wall 45 of the solid body portion 44 and assuming the same curvature as the curved portiton 46, is a ring 53 also having openings 54 therein coinciding with the openings 50 in the inwardly turned portion 45. Extending downwardly from the center of the ring 53 is a spider-like housing 55 having a closed end 56. Slidably mounted within the spider housing 55 is a disc valve 57 which normally engages the under side of the curved portion 46 of the inturned portion 45 of the solid housing 44 and closes the opening 48. The valve 57 is maintained in its closed position by a coil spring 58 pressing against the valve at one end and against the closed portion 56 of the spider-like housing 55.

The filter unit and the parts as described above are so constructed and arranged that regardless which of the bores 12 or 13 are the entrance bores, the filter will filter the material flowing through the casing and have associated with the filter media two valves which open in opposite directions, but not together so that if a highly viscous material when cold is being filtered, some of the material will by-pass the filtering media so as to prevent starvation of the moving parts until warm up occurs. Also, it will be readily seen that if the filtering element should become so contaminated and blocked by the filtrate that one of the valves will be opened by the pressure built up within the filtering element so as to by-pass the filter element thus preventing starvation of the moving parts.

Figure 2:
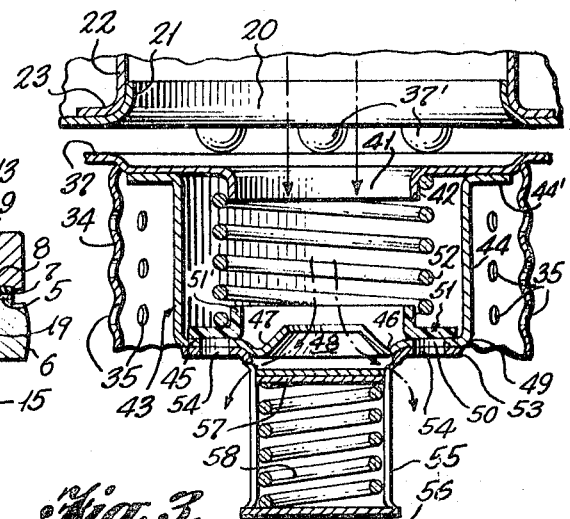
FIG. 2 is a cross-sectional view taken on line 2—2 of FIG. 1.

FIGS. 1 and 2 show by the arrows the flow path of the fluid when the bore 12 is the inflow line. The fluid will flow through the inflow bore 12 around the inside of the housing 22 and outwardly across the space between the end plate 19 and end cap 37 and down around the space between the inner perforated wall 31 and the outer solid wall 16. The fluid will then enter through the perforations 32, pass through the filtering media 33, out through the perforations 35 of the center tube 34 and then downwardly through the coinciding openings 18 and 39 to the bottom of the housing 2. It will then flow upwardly between the solid wall casing 16 and the housing wall 2 to above the filtering unit and outwardly through the outlet 13.

Taking FIG. 2 into consideration on cold start ups or when the filtering media 33 has become clogged or contaminated, the pressure of the fluid within the housing 22 and the solid housing 44 will act upon the valve 57, and will force the same from its seat 46 against the pressure of spring 58, thus causing the fluid to flow directly into the center tube, then downwardly through the coinciding openings 18 and 39 and upwardly between the solid shell 16 and the housing 2 to the outlet 13.

Figure 3:
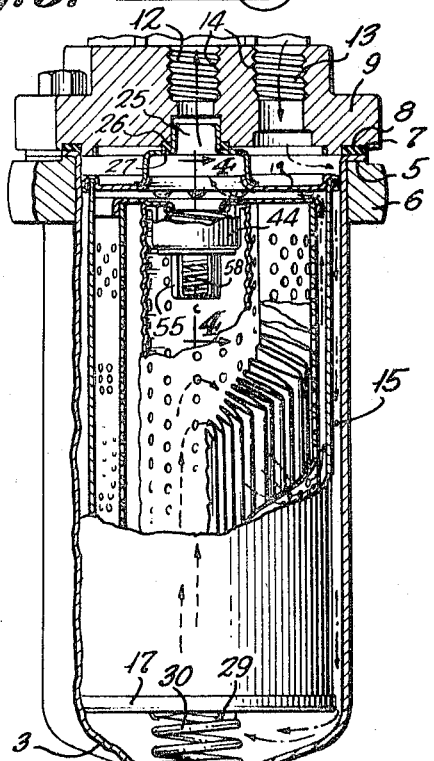
FIG. 3 is a view similar to FIG. 1 but showing the flow path in an opposite direction.
Figure 4:
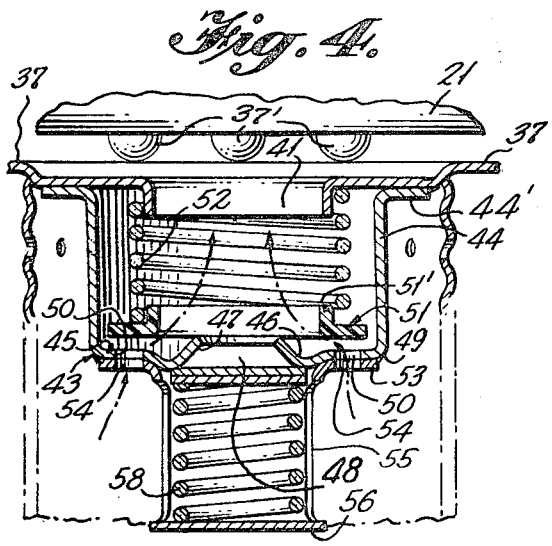
FIG. 4 is a cross-sectional view taken on line 4—4 of FIG. 3.

FIGS. 3 and 4 disclose the flow path when the bore 13 is the entrance bore. Here, the fluid will flow in through the bore 13 and above the space between the head 9, and the end plate 19 of the outer casing of the filtering element, and thence downwardly between the solid wall 16 and the housing 2 to the bottom of the housing 3 and upwardly through the openings 18 and 39 into the center tube 34. Under normal operating conditions, the fluid will then flow through the perforations 35 in the center tube 34 and outwardly through the filtering media 33 and through the perforations 32 of the outer wall 31 of the filtering unit into the space between the outer wrap 31 and the solid wall 16 and upwardly through the space and across the space provided between the end cap 37 and the end plate 19, and outwardly through the outlet 12.

FIG. 4 depicts the action of FIG. 3 during cold start ups or when the filtering media 33 becomes clogged or contaminated. During such conditions the pressure of the fluid within the center tube 34 will build up to such an extent that the valve 51 will be raised against the pressure of the spring 52 from the opening 50 thus allowing the fluid to by-pass the filtering element directly into the outlet 12.

Having described my invention, I now set forth by means of claims what is claimed as my invention, but which claims are not to be construed in any way by the structure so described in the specification.

What is claimed is:

1. A filter housing having a fluid flow therethrough, first and second fluid communication openings in the housing so constructed and arranged that flow may be through the first opening as an inlet and the second opening as an outlet, or through the second opening as an inlet and through the first opening as an outlet, a filter unit in the housing, means to seal the filter unit within the housing and including means to seal a connection between the filter unit with one of the openings, a filter media within the filter unit, a perforated shell surrounding the filter media, end caps on each end of the shell, a perforated central tube within the filter media, openings in the end caps leading into the central tube, an outer solid shell spaced from and surrounding the perforated shell, end plates on the outer shell, the end plates having openings therein in alignment with the openings in the end caps, the sealing means being mounted on one of the end plates, the filter unit comprising the outer shell and end plates, the perforated shell and end caps, the filter media and the central tube being so constructed and arranged in the fluid will be caused to flow through the filter media regardless of which opening is used as the inlet opening, a valve housing within the central tube adjacent one end thereof, oppositely directed valve means within the valve housing normally closing the entrance to the central tube from one of the openings in one of the end caps, the valve means constructed to be opened by the pressure of the fluid caused by blockage of the filter media within the filter unit regardless of the direction of fluid flow through the housing.

2. The structure as set forth in claim 1 wherein the valve means comprises two separate valves, spring means associated with each valve and holding the valves normally closed, one valve opening downwardly when pressure is on the upper side thereof, and the other valve opening upwardly when pressure is on the lower side thereof.

3. The structure as set forth in claim 1 wherein the sealing means comprises a nipple for insertion into one of the openings of the filter housing, sealing means on the nipple to seal the connection, and spring means carried by the other end plate to center the filter unit within the filter housing and to cause the sealing means to tightly engage the opening.

4. The structure as set forth in claim 2 wherein the downwardly opening valve comprises a disc slidably mounted within a spider housing, spring means within the spider housing engaging the disc and forcing the same to a closed position, the downwardly opening valve being opened by pressure of the fluid on the upper surface thereof, and wherein the upwardly opening valve comprises a ring mounted within a closed housing, spring means within the closed housing engaging the ring and forcing the same to a closed position, the upwardly opening valve being opened by pressure of fluid on the lower surface thereof, and concentric valve seats engaged by the valves.

5. The structure as set forth in claim 1 wherein the sealing means comprises a nipple for insertion into one of the openings of the filter housing, sealing means on the nipple to seal the connection, spring means carried by the other end plate to center the filter unit within the filter housing and to cause he sealing means to tightly engage the opening and the valve means comprises two separate valves, spring means associated with each valve and holding the valves normally closed, one valve opening downwardly when pressure is on the upper side thereof, and the other valve opening upwardly when pressure is on the lower side thereof.

6. The structure as set forth in claim 1 wherein the sealing means comprises a nipple for insertion into the one of the openings of the filter housing, sealing means on the nipple to seal the connection, spring means carried by the other end plate to center the filter unit within the filter housing and to cause the sealing means to tightly engage the opening and the valve means comprises two separate valves, one opening downwardly and the other opening upwardly, the downwardly opening valve comprising a disc slidably mounted within a spider housing, spring means within the spider housing engaging the disc and forcing the same to a closed position, the downwardly opening valve being opened by pressure of the fluid on the upper surface thereof, the upwardly opening valve comprising a ring mounted within a closed housing, spring means within the closed housing engaging the ring and forcing the same to a closed position, the upwardly opening valve being opened by pressure of fluid on the lower surface thereon, and concentric valve seats engaged by the valves.

7. A filter housing having a fluid flow therethrough comprising a body having a closed end and an open end, means for mounting the filter housing on a structure, sealing means between the open end and the mounting means, the mounting means having first and second fluid communication openings therein so constructed and arranged that flow may be through said first opening as an inlet and said second opening as an outlet, or through said second opening as an inlet and through said first opening as an outlet, a filter unit within the filter housing, the filter unit comprising a solid cylindrical body, end plates on each end of the cylindrical body, each end plate having a central opening therein, one end plate having a cylindrical connecting body mounted thereon, the connecting body having a reduced portion comprising a nipple for inserting into one of the openings, sealing means sealing the connection, the other end plate having a coil spring carried thereby surrounding the opening therein, the coil spring engaging the closed end of the filter housing body and forcing the nipple into the opening to seal the connection and to center the filter unit within the filter housing, the filter unit having a filter media therein, the filter media comprising an outer perforated shell, a pleated paper filter, a perforated center tube and end caps on each end of the outer shell, each of the end caps having a central opening therein, one end cap being adjacent the one end plate of the filter unit, means on the underside of the one end plate engaging the one end cap to space the filter media in the filter unit, a valve housing on the lower side of the one end cap, the valve housing comprising a cylindrical body portion surrounding the opening in the one end cap and extending downwardly into the center tube, a ring valve in the body portion opening upwardly, a coil spring within the body portion engaging the lower side of the one end cap and the ring valve and normally holding the ring valve closed, the body portion having a bottom wall having flow openings therein engaged by the ring valve to close the same, the bottom wall also having a central opening therein concentrically within the flow openings, a spider housing mounted on the underside of the bottom wall, a valve disc slidable within the spider housing, and opening downwardly, the spider housing having a closed bottom wall, a coil spring within the spider housing engaging the bottom wall and the valve disc and forcing the valve disc to a closed position, the valve disc engaging the central opening of the bottom wall of the valve housing body portion to close the same, the openings of the other end plate and the other end cap coinciding, a sealing means between the other end plate and the other end cap to prevent flow around the openings and spacing the other end cap from the other end plate, the downwardly opening valve disc allowing by-pass flow upon build-up of high pressure when flow is in one direction and the upwardly opening ring valve allowing by-pass flow upon build-up of high pressure when flow is in the opposite direction.

8. A filter housing containing a filter cartridge having first and second fluid communication openings in the housing so constructed and arranged that flow may be through the first opening as an inlet and the second opening as an outlet, or through the second opening as an inlet and through the first opening as an outlet, the cartridge comprising an outer solid shell, end plates on each end of the outer shell, each end plate having an opening therein, one end plate having connecting means for connection to one of the openings, an inner perforated shell within the outer shell and inwardly spaced therefrom, end caps on each end of the inner shell, each end cap having an opening therein coinciding with the opening in each end plate, a perforated central tube within the inner shell and spaced inwardly therefrom, a filter media between the central tube and the inner shell, the filter cartridge comprising the outer shell and the end plates, the perforated shell and end caps, the filter media and the central tube being so constructed and arranged that the fluid will be caused to flow through the filter unit regardless of which opening is used as the inlet opening, a valve housing in the central tube adjacent one end thereof, oppositely directed valve means within the valve housing normally closing the entrance to the central tube from one of the openings in one of the end caps, the valve means constructed to be opened by the pressure of the fluid caused by blockage of the filter media within the filter cartridge regardless of the direction of the fluid flow.

9. The structure at set forth in claim 8 wherein the valve means comprises two separate valves, spring means associated with each valve and holding the valves normally closed, one valve opening downwardly when pressure is on the upper side thereof, and the other valve opening upwardly when pressure is on the lower side thereof.

10. The structure as set forth in claim 9 wherein the downwardly opening valve comprises a disc slidably mounted within a spider housing, spring means within the spider housing engaging the disc and forcing the same to a closed position, the downwardly opening valve being opened by pressure of the fluid on the upper surface thereof, and wherein the upwardly opening valve comprises a ring mounted within a closed housing, spring means within the closed housing engaging the ring and forcing the same to a closed position, the upwardly opening valve being opened by pressure of fluid on the lower surface thereof, and concentric valve seats engaged by the valves.

11. A filter housing containing a filter cartridge having first and second fluid communication openings therein so constructed and arranged that flow may be through said first opening as an inlet and said second opening as an outlet, or through said second opening as an inlet and through said first opening as an outlet, the filter cartridge comprising a solid cylindrical body, end plates on each end of the cylindrical body, each end plate having a central opening therein, one end plate having a cylindrical connecting body mounted thereon, the connecting body having a reduced portion comprising a nipple for insertion into one of the openings, sealing means on the nipple for sealing the connection, the other end plate having a coil spring carried thereby surrounding the opening therein, the coil spring adapted to engage the housing to center the cartridge therein and to force the nipple into the opening to seal the connection, the filter cartridge having a perforated inner shell concentric with the outer shell and spaced inwardly therefrom, a tubular pleated paper filter media within the inner shell, a perforated central tube within the filter media, and end caps on each end of the inner shell, each of the end caps having a central opening therein, one end cap being adjacent the one end plate of the cartridge, means on the underside of the one end plate engaging the one end cap to space the inner shell, filter media, central tube and end caps in the cartridge, a valve housing on the lower side of the one end cap, the valve comprising a cylindrical body portion surrounding the opening in the one end cap and extending downwardly into the center tube, a ring valve in the body portion opening upwardly, a coil spring within the body portion engaging the lower side of the one end cap and the ring valve and normally holding the ring valve closed, the body portion having a bottom wall having flow openings therein engaged by the ring valve to close the same, the bottom wall also having a central opening therein concentrically within the flow openings, a spider housing mounted on the underside of the bottom wall, a valve disc slidable within the spider housing and opening downwardly, the spider housing having a closed bottom wall, a coil spring within the spider housing engaging the bottom wall and the valve disc and forcing the valve disc to a closed position, the valve disc engaging the central opening of the bottom wall of the valve housing body portion to close the same, the openings of the other end plate and the other end cap coinciding, a sealing means between the other end plate and the other end cap to prevent flow around the openings and spacing the other end cap from the other end plate, the downwardly opening valve disc allowing by-pass flow upon build-up of high pressure when flow is in one direction and the upwardly opening ring valve allowing by-pass flow upon build-up of high pressure when flow is in the opposite direction.

References Cited

UNITED STATES PATENTS

| | | | |
|---|---|---|---|
| 2,349,416 | 5/1944 | Freeman | 60—54.6 |
| 3,262,563 | 7/1966 | Pall | 210—443 X |
| 3,272,336 | 9/1966 | Humbert | 210—456 X |
| 3,370,708 | 2/1968 | Hultgren et al. | 210—130 |

REUBEN FRIEDMAN, Primary Examiner

T. A. GRANGER, Assistant Examiner

U.S. Cl. X.R.

210—440